June 1, 1926.
G. W. ELMEN
1,586,889
MAGNETIC STRUCTURE AND METHOD OF MANUFACTURE
Filed March 17, 1924
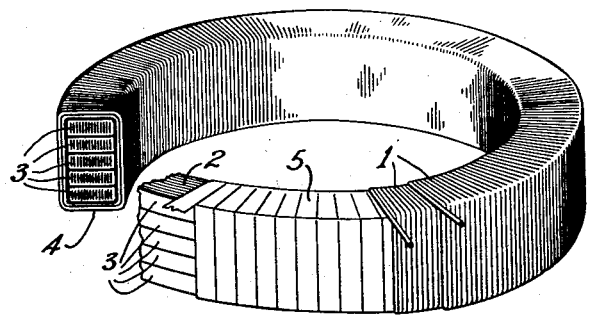
Inventor:
Gustaf W. Elmen,
by ℰ.Ｗ.Ａｄａｍｓ Atty Patented June 1, 1926.

1,586,889

UNITED STATES PATENT OFFICE.

GUSTAF W. ELMEN, OF LEONIA, NEW JERSEY, ASSIGNOR TO WESTERN ELECTRIC COMPANY, INCORPORATED, OF NEW YORK, N. Y., A CORPORATION OF NEW YORK.

MAGNETIC STRUCTURE AND METHOD OF MANUFACTURE.

Application filed March 17, 1924. Serial No. 699,835.

This invention relates to magnetic structures, such as magnetic cores, and methods of producing them.

There has recently been discovered a magnetic alloy comprising nickel and iron, which when properly heat treated has remarkably high permeability at low magnetizing forces of the order employed in electric signaling. This material and its method of manufacture are described at length in the United States application of G. W. Elmen, Serial No. 473,877, filed May 31, 1921. In its preferred proportions it comprises approximately 78½ per cent nickel and 21½ per cent iron. High permeability may be developed in nickel-iron alloys having widely different proportions, but the proportions just mentioned ordinarily give the highest permeability. This alloy varies in permeability to a marked degree when the material is subjected to strain, which impairs its usefulness for many purposes. Strains produced by winding a coil about a laminated core of this material, for example, are often sufficient to materially lower the permeability. Further, the permeability often changes with variations in temperature of the core at which coils are ordinarily required to operate. These variations have been found to be due to the strains in the core material caused by slight distortions produced by the mechanical processes employed in the construction of the cores, and in the placing of the electric winding around them.

It is the principal object of this invention to overcome or greatly reduce these disadvantages in magnetic structures employing material which is sensitive to strain. Other objects will appear from the description which follows.

In carrying out the objects of the invention the magnetic structure is formed for example into portions which are relatively thin, or have small cross-sectional area, which portions together constitute a composite structure, either by being parts of the same sheet or wire or strip coiled or bent or twisted into some desired shape so that the portions are spaced apart, or by being separate pieces held by some means in spaced relation to one another. The structure so formed is then heat-treated to develop high permeability, and finally impregnated with a substance which is liquid or semi-liquid when applied and later solidifies to form a hard rigid mass which can be subjected to ordinary usage without danger of impairment of the permeability of the imbedded magnetic material. The preferred impregnating substance is a so-called phenol condensation product, which is formed from a mixture of phenol with formaldehyde, hexamethylenetetramin, furfural, etc.

The accompanying drawing is a perspective view of a ring-shaped coil (with a portion cut away) the core of which is made in accordance with the invention.

The nickel-iron alloys containing from around 50% to 90% of nickel may best be produced in the following manner:—Iron and nickel in the desired proportions are fused together and the molten composition is poured into a mold and cooled to form a bar or rod. This is then worked down by repeated swaging and drawing or rolling operations until the metal has been reduced to a desired shape and size. The metal then has to be heat treated to develop high permeability. This may be done by subjecting it to a temperature of from 850° C. to 1100° C. for some time. This appears to bring the alloy to a uniform molecular condition. At the higher of these temperatures, a relatively short period will suffice, while at the lower temperatures, several hours may be required. This will, of course, depend very much upon the dimensions of the material. No harm appears to result from heating unnecessarily long during this stage of heat treatment. The rate of cooling after this heating is a matter of considerable importance. The material is cooled down to a temperature a little higher than the magnetic transition temperature, preferably at a conveniently gradual rate, say 30 minutes, with, for example, a coil of loosely wound tape of a thickness of a few thousandths of an inch. The magnetic transition temperature will vary somewhat with the composition but will be in the vicinity of 500° C. to 600° C. The most important part of the heat treatment is the stage which comprises cooling through a temperature zone that includes the magnetic transition temperature and extends to a point considerably below, say 300° C. The rate must be fast enough and yet not too fast. If it is not fast enough the permeability developed will be relatively low, while if it is too fast stresses and strains will be produced which likewise will prevent the development of high permeability. This rate will, of course, vary with the dimensions of the mass of material and somewhat also with its composition and can best be determined by trial in any given case. For example, a strip of the material containing 78½% nickel and 21½% iron, the strip being six thousandths of an inch thick and about half an inch wide, may have high permeability developed therein by being heated (preferably in vacuo) for one hour at 1100° C., cooled from 1100° C. to 650° C. in 30 minutes and from 650° C. to 300° C. in 25 seconds. Any convenient rate may be employed from 300° C. to room temperature.

If the nickel content of the alloy is less than about 50% or 55% or more than about 85% or 90%, the rate of cooling throughout the entire temperature range may be the same and may be much lower that that mentioned above for the range from 650° C. to 300° C. In fact higher permeabilities are in general thus obtained, but the optimum rate must be determined by trial in each case.

It has been found that, when relatively massive pieces of these alloys such as are ordinarily used for cores in electro-magnets, for example, are given the heat treatment described above, not only is the time of initial heating necessarily greatly extended, but it is very difficult and often impossible to cool all parts of the piece at the rate necessary to give high permeability. The inner portions are necessarily cooled more slowly than the outer portions so that both portions cannot be given the highest value of permeability. In accordance with this invention this difficulty is overcome by employing thin sheets of the material, or elements of small cross-sectional area, which can be given a substantially uniform permeability throughout. These are then assembled or bent or coiled to form a structure of any desired size and shape before being given the heat treatment.

Further difficulty was encountered, however, in thus attempting to overcome the difficulties encountered in heat treating large pieces of the material, due to the extreme sensitiveness of the material to stresses and strains with respect to permeability. The decrease in permeability, when ordinary methods of manufacturing a coil were employed, was sometimes as great as 50%. Further, the permeability did not always remain constant after the structure was completed, but changed with variations in temperature of the core at which the coils are ordinarily required to operate. These variations have been found to be due to strains in the core introduced by slight distortions produced by the mechanical processes used in the construction of the cores and in the placing of the electric windings around them. According to this invention this difficulty has been solved by the use of an auxiliary supporting material having characteristics peculiarly adapting it to this purpose.

The drawing shows one embodiment of the invention by way of example. It comprises windings 1 of copper wire upon a magnetic core 2. The core is composed of five coils 3 of nickel iron tape, assembled as shown. Each coil is embedded in a mass consisting of a phenol condensation product which binds the turns together, maintains them spaced from each other, prevents large eddy currents from flowing in the coils, and, what is most important of all, prevents the coils from being distored, either by external forces or changes of temperature ordinarily encountered, and so maintains the high value of permeability which makes the new alloy of so much greater value than all other known materials wherever high and constant permeability is desired. High resistivity, low hysteresis loss and low coercivity are other desirable qualities of this material, and these also change somewhat when the material treated to develop high permeability is strained. These properties are therefore also unaffected by strain in the improved magnetic structure.

The binding material used must not only have properties mentioned above but it must be one which will not during the process of impregnating and hardening introduce strains in the material or otherwise impair its properties. Phenol condensation products are particularly well adapted in this particular also, as will appear from the following description of the process used in forming such a structure for example as that illustrated in the drawing.

The magnetic alloy is formed into a tape preferably not more than ten thousandths of an inch thick. This is then coiled, the continuous layers of coils being separated by paper or other combustible separating material. The structure thus formed is given the heat treatment described above in order to develop high permeability in the magnetic material. The paper is burned out before or during the heat treatment leaving the turns of the coil spaced apart an average distance equal to the thickness of the paper. It is preferable to burn out the paper before the heat treatment as gases from the combustion may, when in a confined space and at the high temperatures required for heat treatment, introduce carbon into the metal and so tend to lower the permeability. Without disturbing the relative position of the turns of the coil and without setting up any stresses whatever in the material, it is impregnated with the phenol condensation product or other product having similar properties. The most suitable material known is a mixture of phenol with formaldehyde, hexamethylenetetramin or furfural, etc. For a description of such material and its preparation see U. S. patent to Baekeland, No. 1,213,726, January 23, 1917. The impregnating process may be carried out either under pressure or in vacuum, after which the structure is exposed to air for a few hours to permit the excess liquid to drain off and the liquid to be transformed into a hard infusible substance by chemical reaction. In order to increase the rate at which this action takes place the coils are sometimes placed in an oven and heated to approximately 70° C. for a few hours. The phenol condensation product is thus transformed into a hard infusible and rigid material in which the magnetic material is embedded and is held so securely in place that the permeability will not be changed materially in the process of manufacturing coils utilizing such core structures or during their subsequent use. If the magnetic material after being heat treated to produce high permeability is again heated above a temperature in the neighborhood of 200° C. or 300° C the permeability is ordinarily much reduced. The phenol condensation product can be soon transformed by chemical action into rigid material without heating to a temperature greater than 60° or 70° C.

As suggested above, the impregnating material must be one which does not expand when hardening to an amount which would set up strains in the magnetic material, and must likewise have a coefficient of expansion near enough that of the nickel-iron alloy to prevent material strains being set up in the latter when the completed structure is subjected to changes of temperature which would be encountered in the ordinary use of such structures. The phenol condensation product fully meets both of these requirements.

The magnetic coil structure thus produced may be employed alone or in combination with a plurality of similar coils. The latter arrangement is shown in the drawing, the separate coil units being bound together and held in position with fabric tape 5. This tape may be applied with sufficient pressure to produce a very rigid structure without materially affecting the permeability of the magnetic alloy. Likewise, the wire 1 may be applied to the core with tensions usually employed, without changing the characteristics of the loading material.

It is frequently desired to provide air gaps in core structures to regulate the rate at which the flux varies with variations in the current in the coil. The simplest and cheapest process by which such gaps can be produced is to introduce saw cuts of the desired width, but magnetic alloys having a high permeability cannot ordinarily be treated in this manner without reducing the permeability to a very low value in a relatively large region of the core structure around the cut. The magnetic core of this invention, however, is superior in this respect also, since saw cuts can be made without setting up strains in the magnetic material except in a negligibly small region.

The drawing illustrates a coil having a saw cut at 4, a portion of the coil structure on one side of the cut being broken away to show the core structure.

It is practical, of course, to assemble the heat treated magnetic coils and impregnate them after assembly instead of impregnating each coil separately as described above. The advantage of separate impregnation is that each coil then forms a unit from which structures of various sizes may easily be built up, and it is not so difficult to carry out a uniform heat-treatment when the structure is small.

In a similar manner the units may be formed of pieces of the alloy of shape different than that described above and assembled to form a composite structure of any desired shape and size. When separate short pieces of the same size and shape are to be assembled they may be separately heat-treated, stacked or fitted together, one within or closely fitting another, without in any way being bent or strained and the whole impregnated and surrounded by the supporting material. Where the structure is to be subjected in use to constant magnet fields, rather than alternating or fluctating fields, so that no precautions need be taken to prevent eddy currents, it is not essential that the separate elements be separated by insulating material.

What is claimed is:

1. A magnetic structure comprising thin laminæ of magnetic material, and means to hold said laminæ in spaced relation and to protect said magnetic material from mechanical strain comprising a matrix of hard rigid insulating material in which the laminæ are embedded.

2. A magnetic structure comprising thin laminæ of magnetic material, and means to hold said laminæ in spaced relation and to protect said magnetic material from mechanical strain comprising a matrix of hard rigid infusible insulating material in which said laminæ are embedded.

3. A magnetic structure comprising a magnetic material in the form of a coil, and means to hold the convolutions of said coil in spaced relation and to protect the magnetic material from mechanical strain comprising a matrix of hard rigid insulating material.

4. A magnetic structure comprising a magnetic alloy containing from 75% to 80% of nickel, said material being in the form of portions of relatively small thickness or cross-sectional area, bound together with a phenol condensation product.

5. The method of producing a magnetic structure from magnetic material which requires heat treatment to develop high permeability therein and the permeability of which is sensitive to strains, which comprises loosely assembling magnetic material of small cross sectional area or relatively small thickness to provide portions spaced from and movable with respect to each other, subjecting the assembled structure to heat treatment to develop high permeability and securing said portions in the spaced relation assumed after heat treatment.

6. The method of producing a magnetic structure of magnetic material the permeability of which is sensitive to strains and which requires a heat treatment to develop high permeability therein which comprises forming said material into portions of relatively small thickness or cross-sectional area, and in spaced relation with respect to each other, heat treating the structure so formed to produce high permeability and impregnating this structure after the heat treatment with a material which penetrates between and surrounds said portions and which hardens to hold the portions in position without permitting strains therein when the finished structure is subjected to external forces.

7. The method of producing a magnetic structure comprising an alloy of nickel and iron in which high permeability may be developed by heat treatment and the permeability of which is sensitive to strains, which method comprises forming said alloy into portions of relatively small thickness or cross-sectional area and in spaced relation with respect to each other, subjecting the structure so formed to heat treatment to develop high permeability, impregnating the heat treated structure with a phenol condensation product and causing the product to solidify to form a hard infusible mass in which the magnetic material is embedded.

8. The method of producing a magnetic structure from a magnetic material in which high permeability may be developed by heat treatment and the permeability of which is sensitive to strains, which comprises forming said material into portions of relatively small thickness or cross-sectional area, spacing said portions one from another with combustible material, removing said spacing material by combustion, and heat-treating the structure so formed to develop high permeability.

9. The method of producing a magnetic structure comprising a nickel-iron alloy in which high permeability may be developed by heat treatment which comprises forming said material into portions of relatively small thickness or cross-sectional area, subjecting the structure so formed to heat treatment to produce high permeability, impregnating the heat treated structure with a phenol condensation product, and heating the impregnated structure to a temperature less than 200° C. to form a hard infusible mass in which the nickel-iron alloy is embedded.

10. The method of producing a magnetic structure from magnetic material in which high permeability may be developed by heat treatment and the permeability of which is sensitive to strain, which comprises forming said material into portions of relatively small thickness or cross sectional area, spacing said portions one from the other with a spacing material, removing said spacing material and heat treating the structure so formed to develop high permeability.

In witness whereof, I hereunto subscribe my name this 12 day of March A. D., 1924.

GUSTAF W. ELMEN.